United States Patent [19]
Barnhart et al.

[11] Patent Number: 5,311,659
[45] Date of Patent: May 17, 1994

[54] APPARATUS FOR INSTALLING INSTRUMENT PANEL ASSEMBLIES IN AUTOMOTIVE VEHICLE BODIES

[75] Inventors: Robert J. Barnhart, East Detroit; Richard M. Hackman, Sterling Heights, both of Mich.

[73] Assignee: Chrysler Corporation, Highland Park, Mich.

[21] Appl. No.: 103,380

[22] Filed: Aug. 9, 1993

[51] Int. Cl.$^5$ .............................................. B23P 19/00
[52] U.S. Cl. ........................................ 29/823; 29/709; 29/787; 29/430; 29/897.2; 198/345.2; 198/346.2; 414/225
[58] Field of Search ............... 29/407, 430, 709, 711, 29/783, 787, 822, 823, 824, 897.2; 901/39, 41, 46; 414/222, 225, 226; 198/345.1, 345.2, 346.2

[56] References Cited

U.S. PATENT DOCUMENTS

| | | | |
|---|---|---|---|
| 4,658,501 | 4/1987 | Fujii et al. | 29/824 X |
| 4,757,608 | 7/1988 | Ochi | 414/225 X |
| 4,815,190 | 3/1989 | Haba, Jr. et al. | 29/430 |
| 4,876,786 | 10/1989 | Yamamoto et al. | 29/787 X |
| 5,088,176 | 2/1992 | Koga | 29/430 |
| 5,167,065 | 12/1992 | Koga | 29/824 |
| 5,216,800 | 6/1993 | Nishigori | 29/430 X |

FOREIGN PATENT DOCUMENTS 1-228786 9/1989 Japan ........................................ 901/41

*Primary Examiner*—Mark Rosenbaum
*Assistant Examiner*—S. Thomas Hughes
*Attorney, Agent, or Firm*—Edward A. Craig

[57] ABSTRACT

Apparatus for transferring an instrument panel assembly from a pick-up station to the interior of an automotive vehicle body for installation while the body moves along a path spaced laterally from the pick-up station. A bridge is mounted for movement along a track which is parallel to the path. The bridge extends between the pick-up station and the path. A swing frame assembly is mounted on the bridge for movement between the pick-up station and the path. The swing frame assembly has a pivoted arm which swings about a generally vertical axis. The arm is swingable from a receiving position for picking up an instrument panel assembly at the pick-up station to a transfer position in which the instrument panel assembly may be introduced into the body and installed therein when the carriage moves along the bridge and the bridge moves in unison with the body. A second bridge spaced from the first bridge is in the direction of the vehicle body movement also moves along the track. A second swing frame assembly is movable along the second bridge and has a pivoted arm provided with a mounting unit on the swinging end of the arm to complete the attachment of the instrument panel assembly to the frame of the vehicle body.

5 Claims, 19 Drawing Sheets

APPARATUS FOR INSTALLING INSTRUMENT PANEL ASSEMBLIES IN AUTOMOTIVE VEHICLE BODIES

This invention relates generally to automotive assembly line practices and refers more particularly to apparatus for installing instrument panel assemblies in automotive vehicles bodies.

BACKGROUND AND SUMMARY

A substantial amount of manual labor is still required in the assembly of automobiles. To the extent that mechanical and power equipment can be employed in these processes, less time and physical labor are required and fewer injuries incurred.

The apparatus of the present invention is especially adapted to transfer an instrument panel assembly to a moving vehicle body on an assembly line in an automobile assembly plant and install it in the body.

In the specific embodiment about to be described, a bridge is mounted for movement on a track that extends generally parallel to the assembly line along which the vehicle bodies move. The bridge extends between a pick-up station and the path of the vehicle bodies. A swing frame assembly is movable along the bridge. A pivoted arm on the swing frame assembly swings from a receiving position adjacent the pick-up station where it picks up an instrument panel assembly, to a transfer position in which the instrument panel assembly may be introduced into the vehicle body when the swing frame assembly is moved along the bridge towards the assembly line. The instrument panel assembly is then secured to the body. Means are provided for moving the bridge in unison with the vehicle body to facilitate entry of the instrument panel assembly thereinto.

Farther along the assembly line, a second bridge is mounted for movement along the track and a second swing frame assembly is movable along the second bridge. The second swing frame assembly is maneuvered into the interior of the vehicle body and has means for completing the securement of the instrument panel assembly in the installed position. During this time the second bridge moves in unison with the vehicle body.

It is an object of this invention to provide apparatus for installing instrument panel assemblies in vehicle bodies having the foregoing general capabilities.

Another object is to provide apparatus for transferring instrument panel assemblies to automotive vehicle bodies and installing them therein which is of relatively simple construction and operation.

These and other objects, features and advantages of the invention will become more apparent as the following description proceeds, especially when considered with the accompanying drawings.

DETAILED DESCRIPTION

Figure 1:
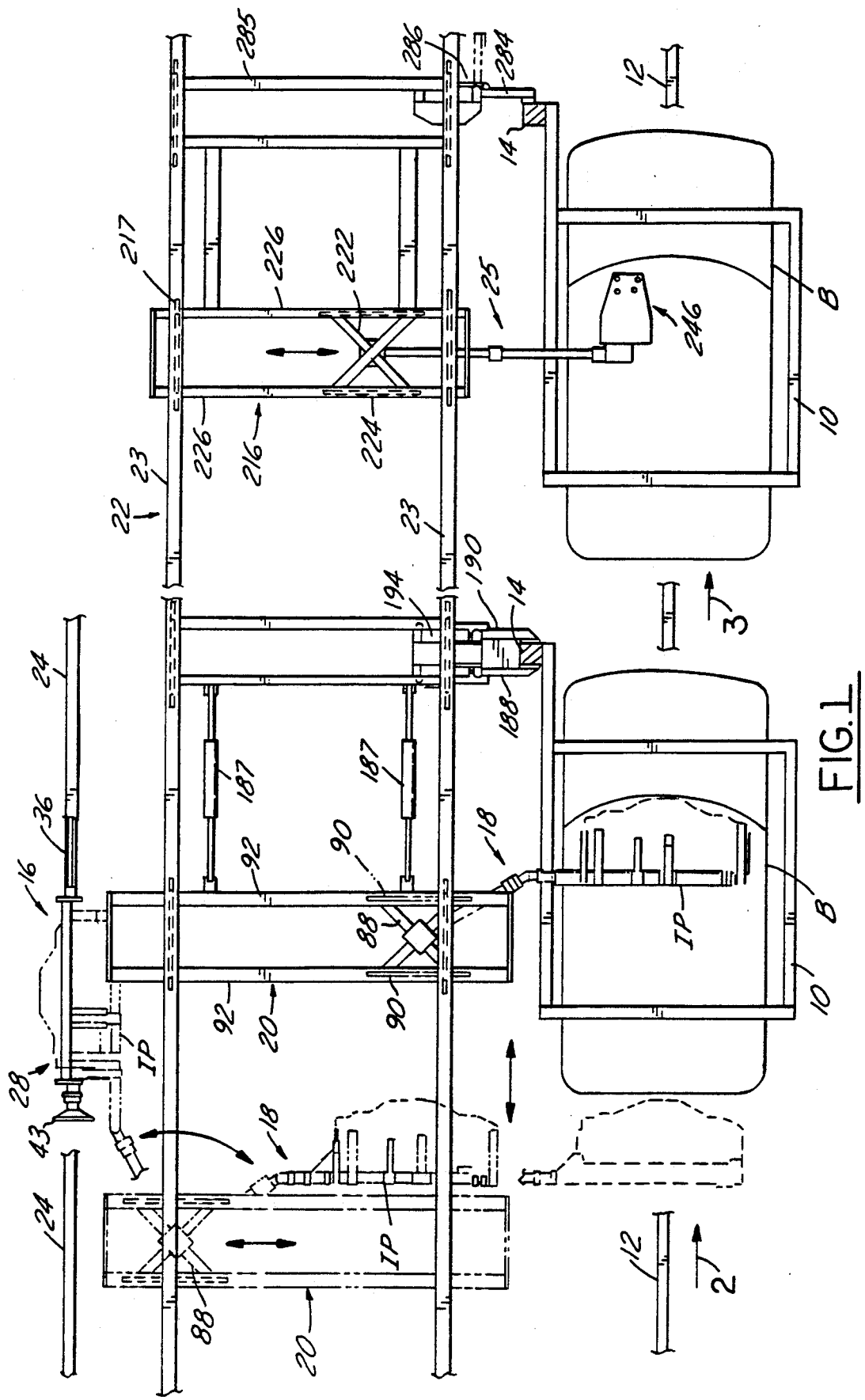
FIG. 1 is a semi-diagrammatic top plan view with parts broken away of apparatus constructed in accordance with the invention.
Figure 2:
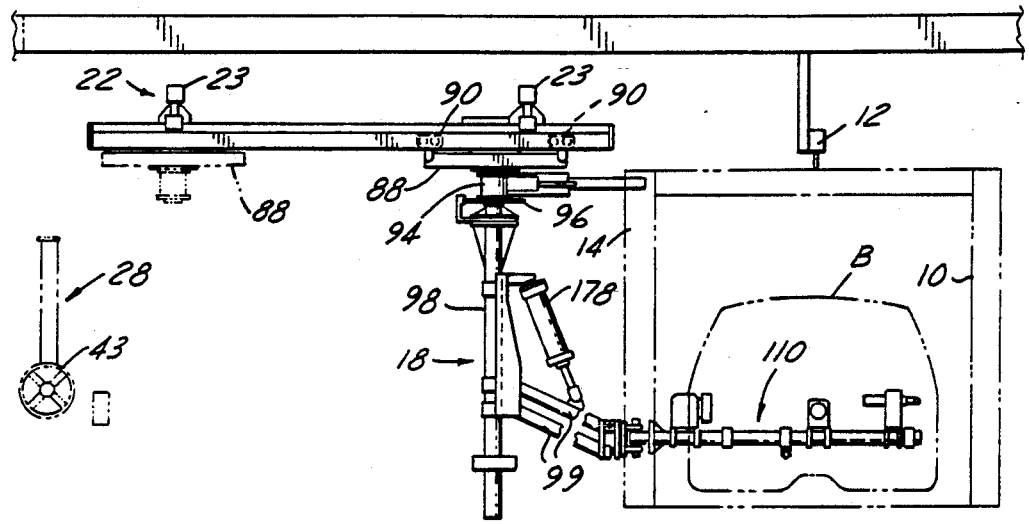
FIG. 2 is a view looking in the direction of the arrow 2 in FIG. 1.
Figure 3:
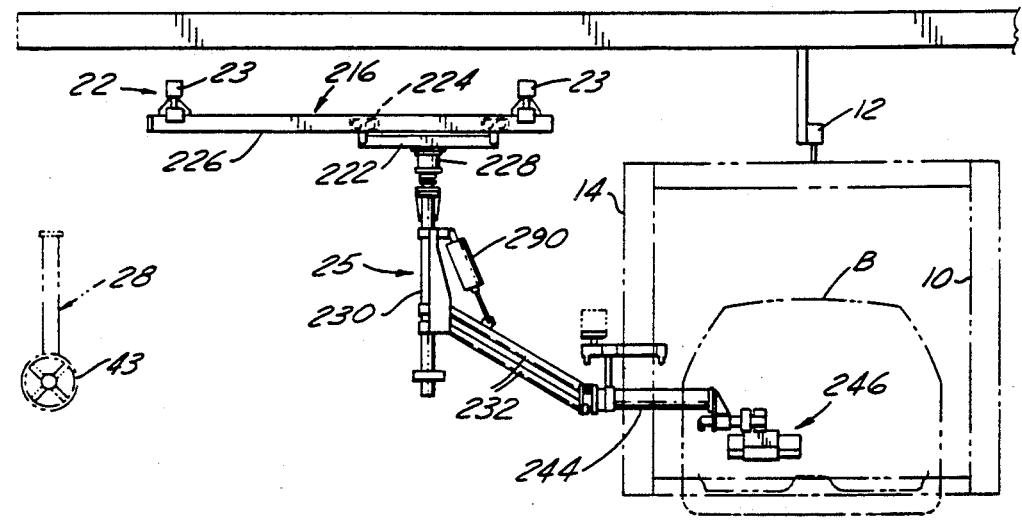
FIG. 3 is a view looking in the direction of the arrow 3 in FIG. 1.
Figure 4:
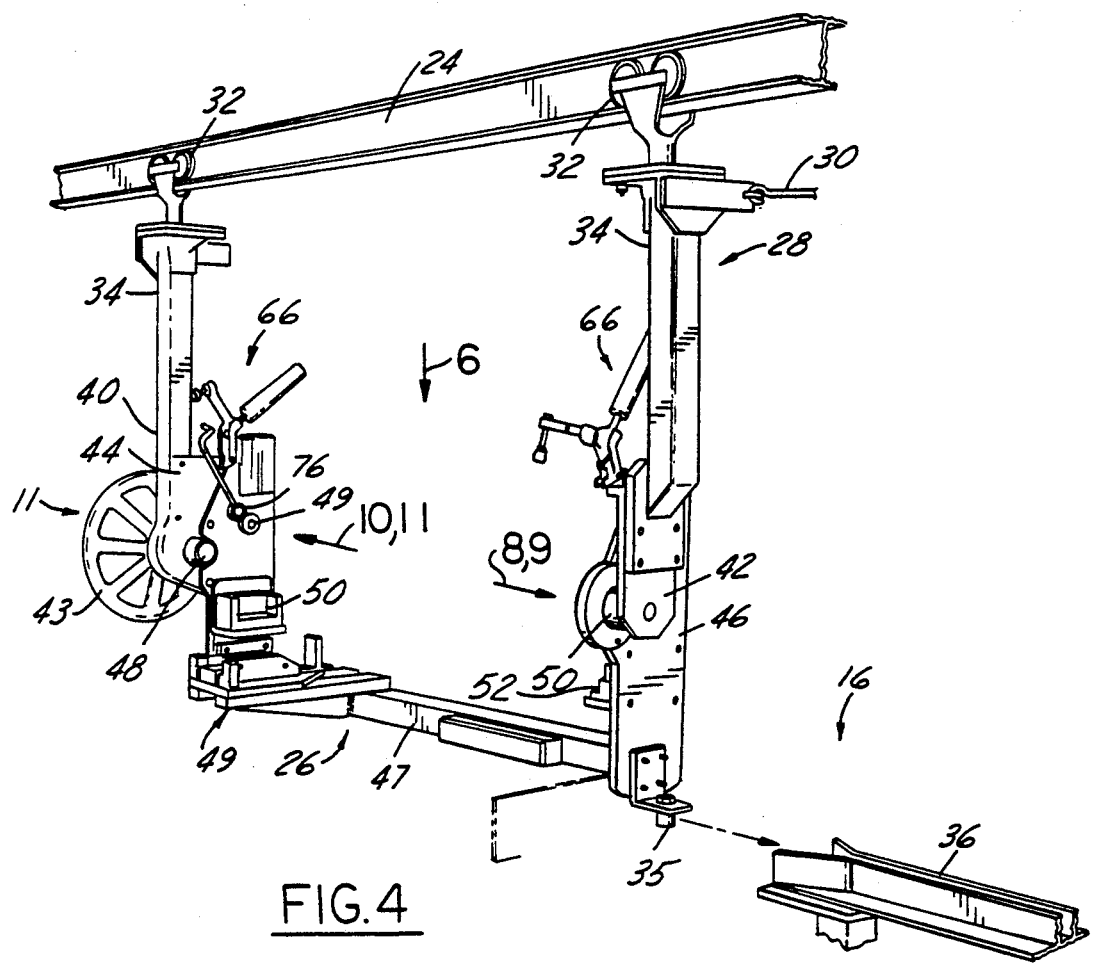
FIG. 4 is a perspective view of the trolley and fixture for supporting an instrument panel assembly at the pick-up station.
Figure 5A:
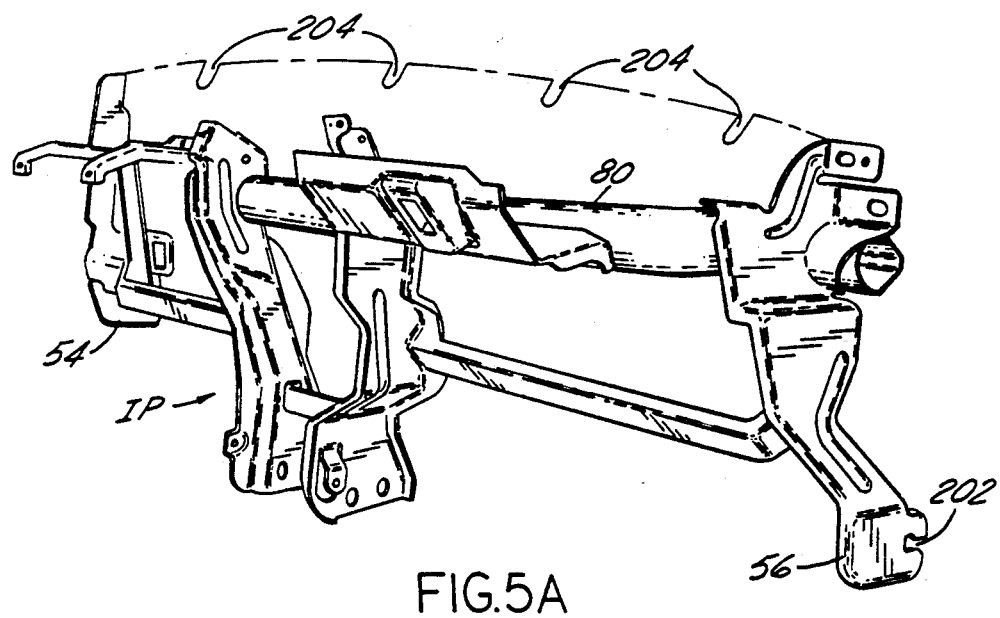
FIG. 5A a perspective view of the instrument panel assembly as seen from one side thereof.
Figure 5B:
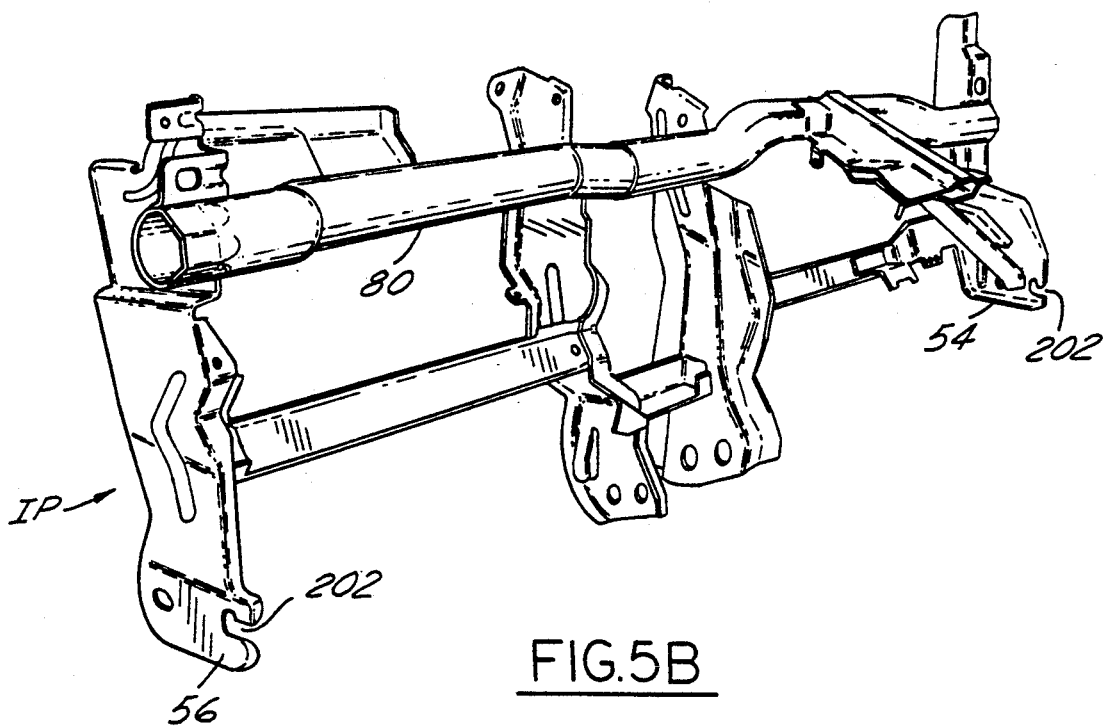
FIG. 5B is a perspective view of the instrument panel as viewed from the opposite side thereof.
Figure 6:
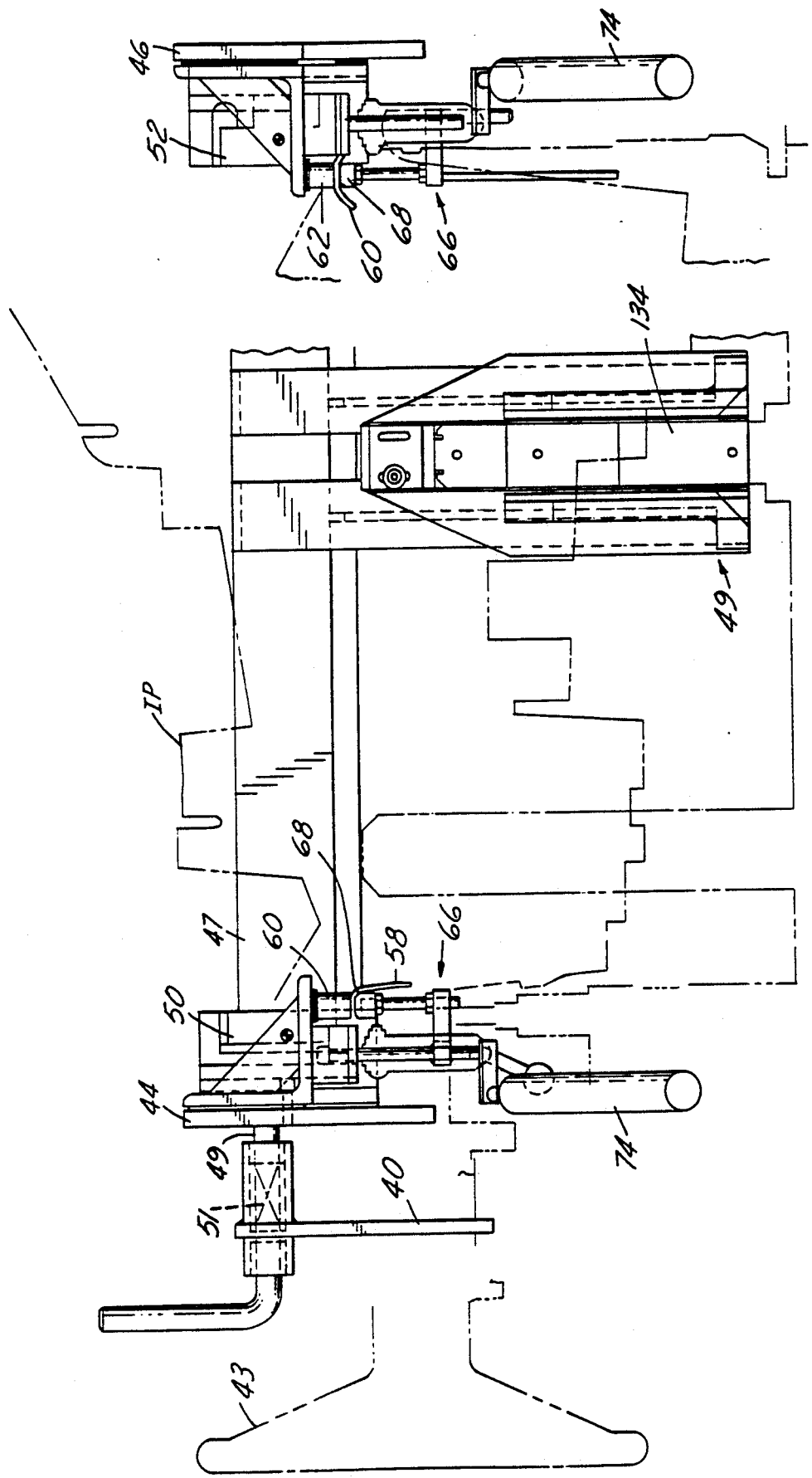
FIG. 6 is fragmentary top plan view showing portions of the fixture for holding the instrument panel assembly at the pick-up station, looking in the direction of the arrow 6 in FIG. 4.
Figure 7:
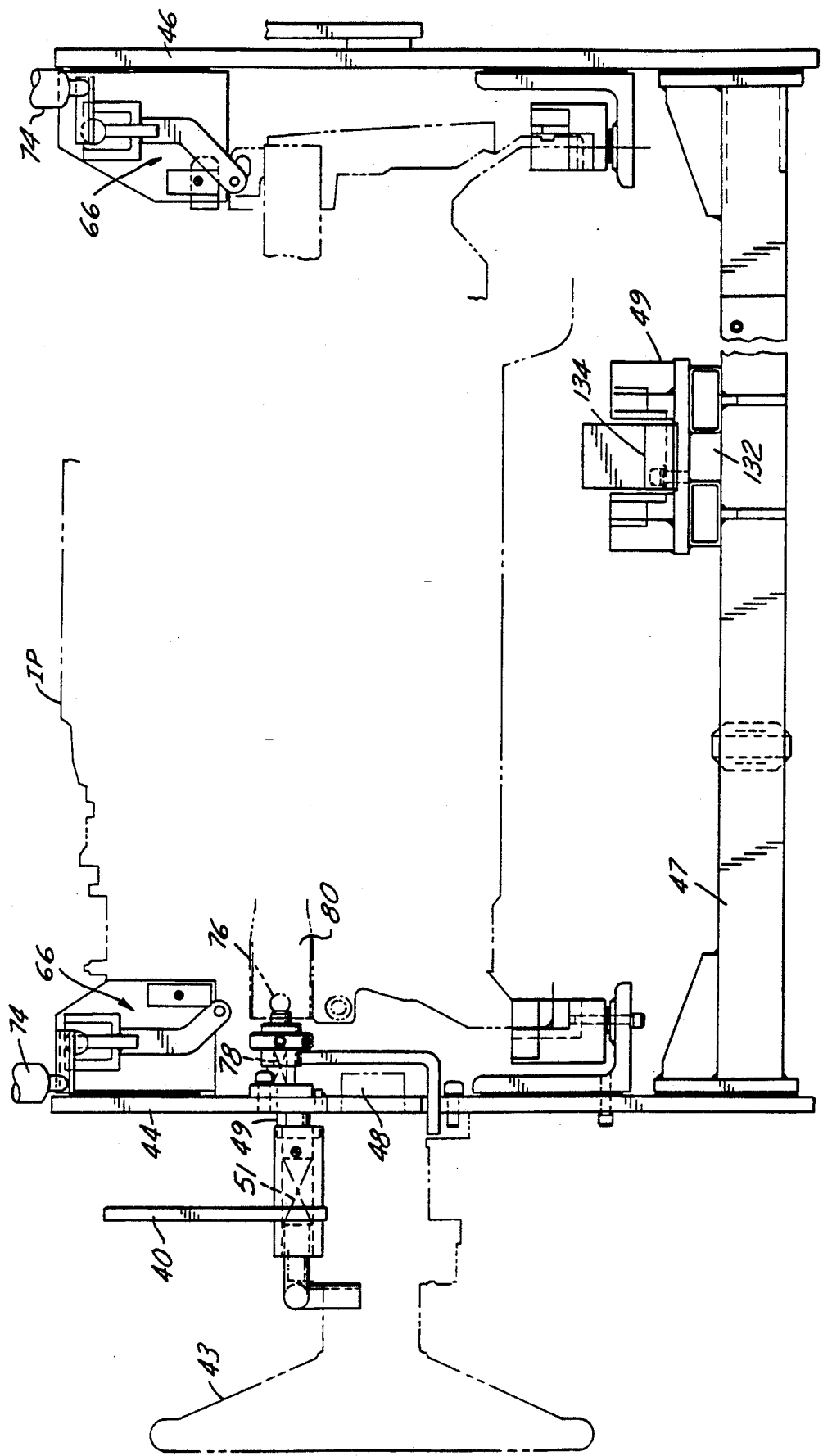
FIG. 7 is a view looking in the direction of the arrow 7 in FIG. 6.

Referring now more particularly to the drawings and especially to FIGS. 1-3 thereof, automotive car bodies B are shown individually mounted on body carriers 10 which are moved along an assembly line 12 in longitudinally spaced apart relation by any suitable means (not shown). The car bodies are disposed lengthwise of the direction of movement of the assembly line. Instrument panel assemblies IP are adapted to be transferred from a pick-up station 16 spaced laterally to one side of the assembly line 12 and installed in the moving car bodies. The instrument panel assemblies are transferred by a swing frame assembly 18 which is mounted on a bridge 20 for transverse movement from the pick-up station to the assembly line. The moving car body carriers 10 each have a vertical post 14 for contacting an arm connected to the bridge 20 and moving the bridge along track 22 in unison with the car bodies B so that the instrument panel assemblies can be transferred while the car bodies are moving. Track 22 consists of rails 23 which are parallel to the assembly line 12 and are engaged by rollers on the bridge 20. After the instrument panel assemblies are installed and initially secured in the car bodies, a second swing frame assembly 25 is employed for the final securement of the instrument panel assemblies.

The pick-up station 16 is located at a point along a rail 24 which is parallel to and laterally spaced from the assembly line 12 along which the car bodies travel. A fixture 26 for carrying an instrument panel assembly is mounted on a trolley 28 which has rollers 32 engaging the rail 24. The trolley is moved along the rail by any suitable means which may include the hook 30.

Referring to FIGS. 4–11, the trolley has vertical hangers 34 with the rollers 32 at the upper ends. The fixture 26 extends between and is supported by and secured to the hangers 34 of the trolley. The trolley with an instrument panel assembly on the fixture moves into the pick-up station where rollers 35 on the bottoms of the hangers 34 enter the channel-shaped roller guide 36 to stabilize the trolley and keep it from swinging. During this movement of the trolley at the pick-up station, the swing frame assembly 18 takes the instrument panel assembly from the fixture on the trolley and later transfers it to a car body B.

The hangers of the trolley have parallel side panels 40 and 42. The fixture has parallel side panels 44 and 46 between the side panels 40 and 42 which are pivoted to the latter by aligned horizontal shafts 48 and 50. Shaft 48 is secured to side panel 44 of the fixture and extends through a bushing in the side panel 40 of the trolley. A wheel 43 on the outer end of shaft 48 is used to manually turn the fixture to facilitate assembling certain components on the instrument panel before the trolley reaches the pick-up station. A pin 49 slidable in side panel 40 of the trolley is urged by a spring 51 to a position in which it extends through a hole in the side panel 44 of the fixture to lock the fixture against rotation relative to the trolley. This pin may be withdrawn manually to release the fixture and allow it to be rotated. The fixture has a horizontal bar 47 secured to and extending between the lower ends of the side panels 44 and 46. Bar 47 has a docking or locating device 49 for guiding the swing frame assembly into proper position for receiving the instrument panel assembly as more fully described hereinafter.

The side panels of the fixture have channel-shaped rests 50 and 52 on the inner surfaces for supporting the laterally spaced feet 54 and 56 on the bottom of the instrument panel assembly IP. The instrument panel assembly has upper side portions 58 and 60 which are clamped to blocks 62 and 64 on the fixture by clamps 66. Each clamp has a clamping head 68 carried by an arm 70 pivoted to a bracket 72 on One of the side panels 44, 46. Handles 74 likewise pivoted to the bracket 72 are used to move the clamping heads 68 into and out of clamping engagement with the side portions 58 and 60 of the instrument panel assembly. The instrument panel assembly is supported on the rests 50 and 52 and held in position by the clamps 66. The instrument panel assembly is thus securely attached to the fixture by the clamps 66 and rests 50, 52 so that certain components may be applied to the instrument panel before the trolley and fixture with attached instrument panel reach the pick-up station.

In addition to the clamps 66, fixture 26 is provided with a pin 76 for engaging and retaining the upper portion of the instrument panel. Pin 76 is slidable in side panel 44 of the fixture 26 and is urged by a spring 78 to a position in which it extends into the end of a horizontal tube 80 which is affixed to and forms a part of the instrument panel assembly. The pin may be manually retracted against the force of the spring 78 to release the instrument panel assembly.

Figure 8:
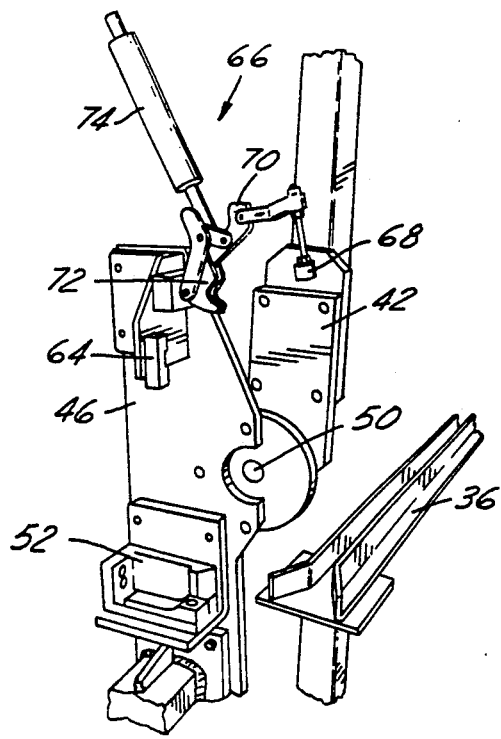
FIG. 8 is a perspective view looking in the direction of the arrow 8 in FIG. 4.
Figure 9:
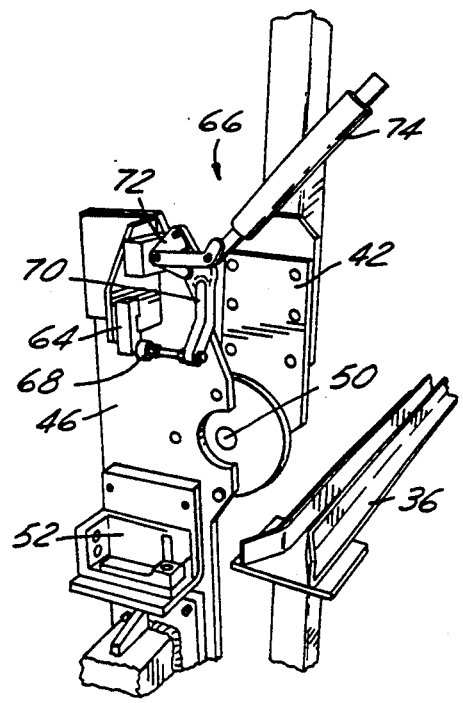
FIG. 9 is a perspective view looking in the direction of the arrow 9 in FIG. 4.
Figure 10:
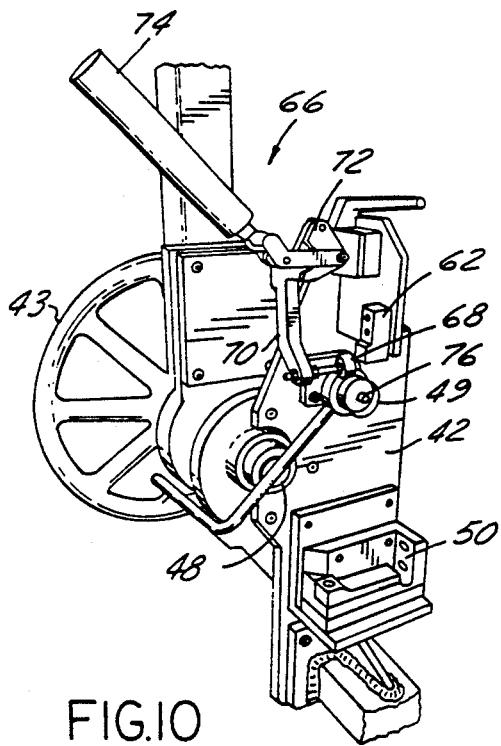
FIG. 10 is a perspective view looking in the direction of the arrow 10 in FIG. 4.
Figure 11:
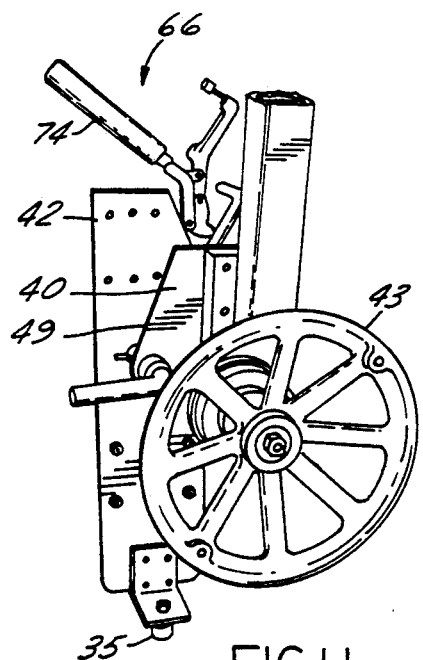
FIG. 11 is a perspective view in the direction of the arrow 11 in FIG. 4.
Figure 12:
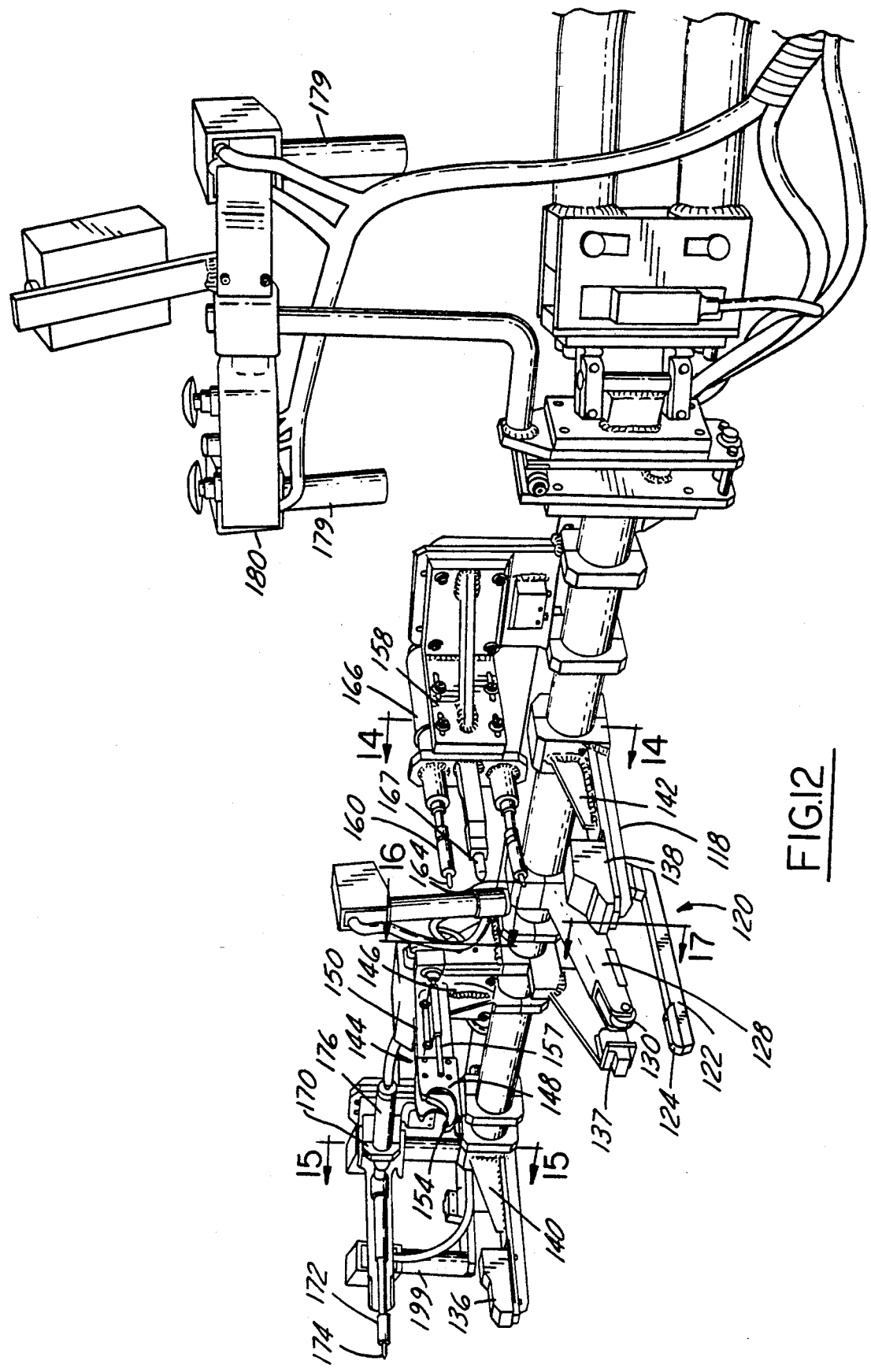
FIG. 12 is a fragmentary perspective view of one of the swing frame assemblies.

The clamps 66 will usually be released and swung out of the way to the position shown in FIGS. 8 and 11 to clear the swing frame assembly 18 and permit it to attach to the instrument panel assembly preparatory to removal of the instrument panel assembly from the fixture. During this time the instrument panel assembly is held by pin 76. Pin 76 is, of course, retracted to release the instrument panel assembly after the swing frame assembly becomes attached thereto.

Referring to FIGS. 12–22, the swing frame assembly has a carriage 88 provided with roller units 90 engaging the parallel rails 92 of the bridge 20 to enable the carriage to move along the bridge from a position adjacent the pick-up station to a position adjacent to the assembly line 12.

Affixed to the bottom of the carriage is a head 94 to which a horizontal circular brake disk 96 is secured. An elongated vertical column 98 extends downwardly from the head and is pivoted thereto for axial rotation. Brake pads 101 for engaging the brake disk are mounted on a plate 97 projecting from the column. An articulated arm assembly projects radially outwardly from column 98 and has a pair of parallel arms 99 secured at one end to a bracket on the column for vertical swinging movement on pins 100 and 102. The opposite ends of the arms are connected to an upright bracket 104 for vertical pivotal movement on pins 106 and 108. The pins 100, 102, 106 and 108 are arranged in a rectangular pattern on parallel axes so that the arms form a parallelogram linkage and pivot up and down as a unit while the upright bracket 104 at the end of the arms remains at all times in the same upright position.

Projecting generally horizontally from the upright bracket 104 is a beam 110 which carries various instruments for guiding the beam into proper position to pick up an instrument panel assembly on a fixture at the pick-up station, for supporting the instrument panel assembly on the beam and temporarily securing it thereto, and for securing the instrument panel assembly to the frame of an automobile body. The beam is connected to the bracket 104 for pivotal adjustment by a horizontal hinge 112, such pivotal adjustment being effected by a piston-cylinder assembly 114. The beam is usually kept in a horizontal position but occasionally it is necessary to pivotally adjust the beam because the car body in which the instrument panel assembly is to be installed sometimes is tipped or inclined away from the horizontal slightly to one side or the other and the beam should be similarly inclined.

The beam 110 must be located with precision when it receives an instrument panel assembly from the fixture on a trolley at the pick-up station. For this purpose a bracket 118 secured to the beam has a probe 120 (FIGS. 12 and 17) comprising a forwardly projecting lower bar 122 with a terminal enlargement 124 and a forwardly projecting upper bar 128 with a terminal roller 130. The probe enters the docking or locating device 49 on the fixture.

The locating device 49 has a tunnel 132 which is open at the side facing the assembly line 12 and has a ramp 134 above the tunnel. When the beam 110 is moved toward the fixture 26 at the pick-up station, the roller 130 follows the ramp and guides the lower probe bar 122 into the tunnel 132 to properly locate the beam for reception of an instrument panel on the fixture.

The beam has laterally spaced rests 136 and 138 mounted on brackets 140 and 142 secured to and extending from the beam in the same forward direction as the probe bars. When the beam is properly located by the probe bars 122 and 128 in locating device 49, the instrument panel assembly on the fixture will be supported on the rests 136 and 138, and will engage the anti-rotation member 137 also affixed to the beam.

The beam 110 also has a clamping device 144 (FIGS. 12 and 16) between rests 136 and 138. Clamping device 144 is rigidly mounted on beam 110 by a bracket 146 and has a pair of generally C-shaped, closely laterally spaced fingers 148 which are fixed to the housing 150 on bracket 146 and open at the front in order to receive to tube 80 of the instrument panel assembly. Between the fixed fingers 148 and pivoted to the housing 150 on a pin 152 is a generally C-shaped finger 154 which is normally swung downwardly to an open position by a torsion spring 155 on pin 152. A piston-cylinder assembly 156 in housing 150 has a piston rod which is extended forwardly when the cylinder is pressurized to swing the pivoted finger 154 upwardly to the position shown in FIG. 16 and clamp the tube 80 and thus secure the instrument panel assembly to the beam. The cylinder assembly cannot be operated, however, until a switch 157 on the beam is engaged by a properly located instrument panel assembly on the beam.

A tool housing 158 is rigidly mounted on beam 110 adjacent one end thereof and has fastener drivers 160 and 162 pointing forwardly for inserting fasteners 164 into prepared holes in the instrument panel assembly. Tool motors 166 on the housing 158 operate the drivers 160 and 162 to set the inserted fasteners in the frame of the car body as more fully described hereinafter. Also mounted on housing 158 is a forwardly projecting locating pin 167 which extends into a hole in the instrument panel assembly for locating purposes.

Another tool housing 170 is rigidly mounted on beam 110 adjacent the opposite end thereof, and has a fastener driver 172 pointing forwardly for inserting a fastener 174 into a hole in the instrument panel assembly. A tool motor 176 operates the driver 172 to set the inserted fastener 174 in the frame of the car body.

The beam 110 can be raised and lowered manually. An air balancing piston-cylinder assembly 178 connected at one end to the column 98 and at the other end to one of the arms 99 will maintain the beam at whatever elevation the operator selects.

A control panel 18 for the swing frame assembly is mounted on the beam 110 and provides the operator with the controls for operating the tool motors 166 and 176, and the cylinder assemblies 114 and 156. The control panel 180 is adjacent to the operator handles 179.

Figure 13:
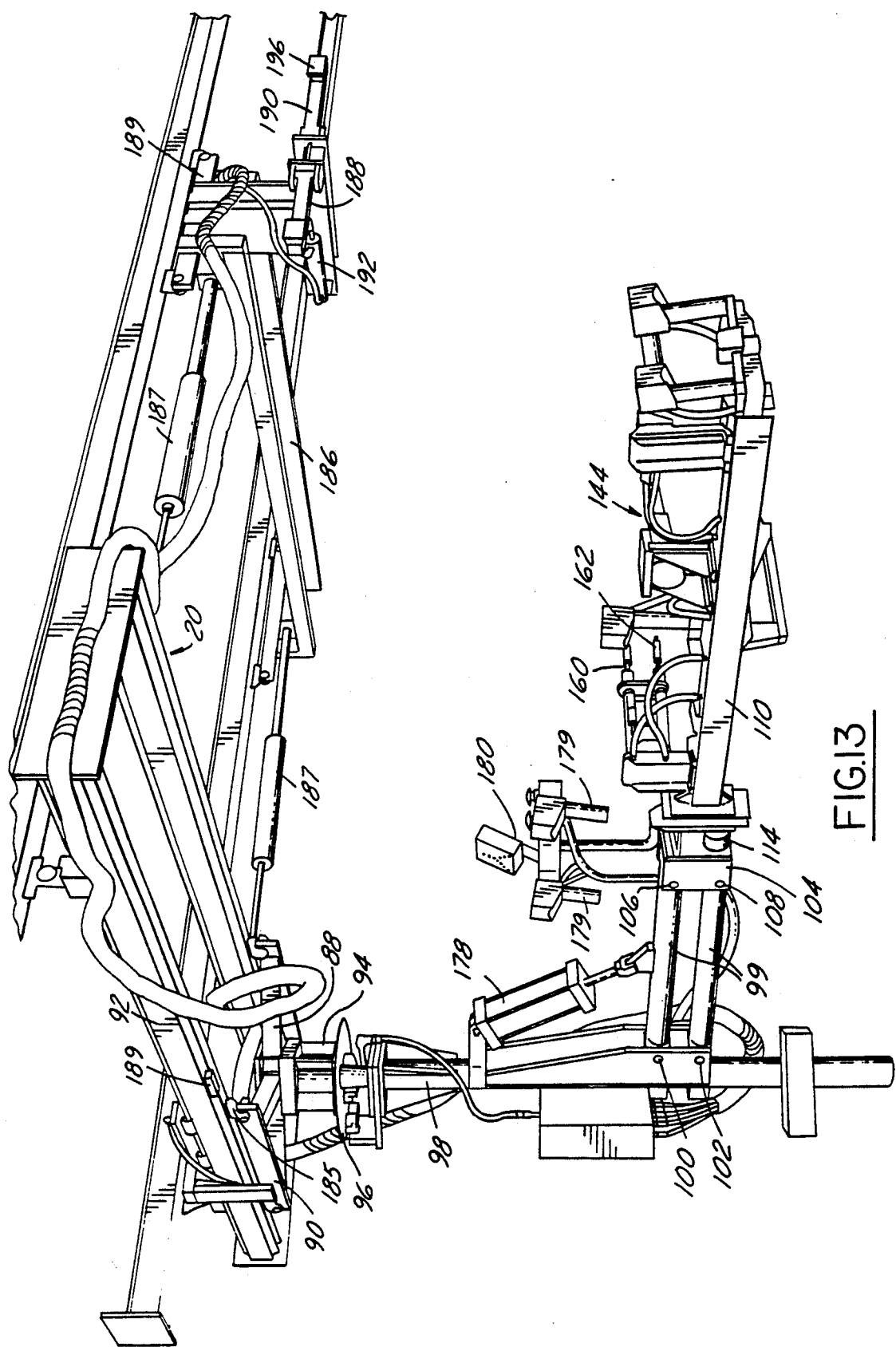
FIG. 13 is a perspective view of the swing frame assembly as seen from another angle and also showing the traveling bridge on which the swing frame assembly is mounted.
Figure 13A:
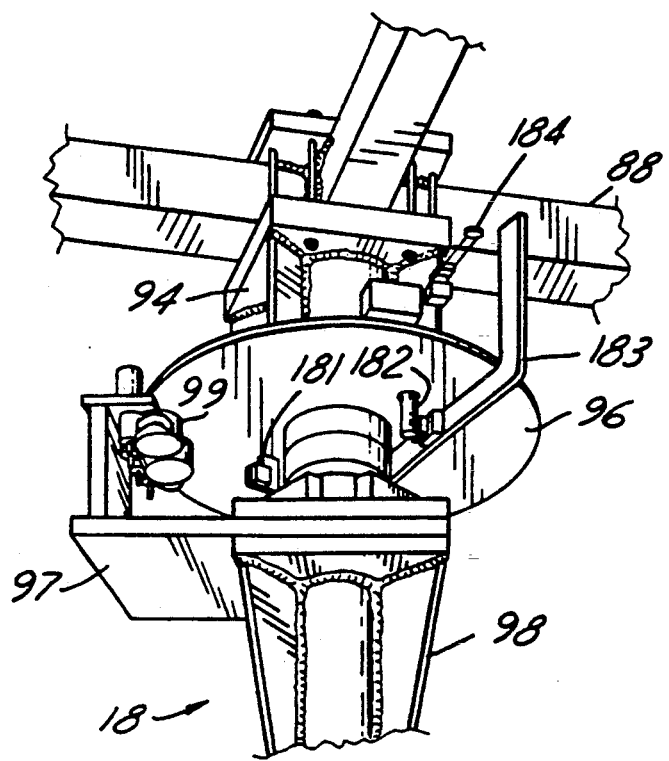
FIG. 13A is a fragmentary perspective view of a portion of the swing frame assembly.
Figure 14:
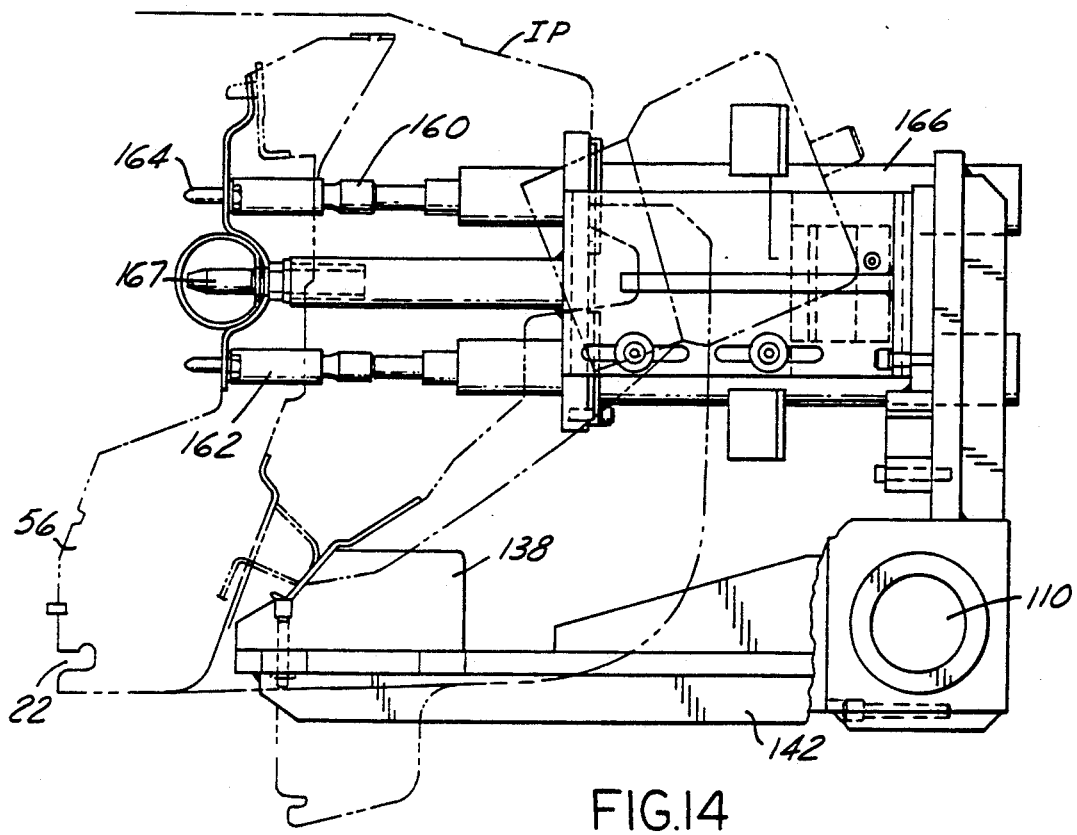
FIG. 14 is a sectional view taken on the line 14—14 in FIG. 12.
Figure 15:
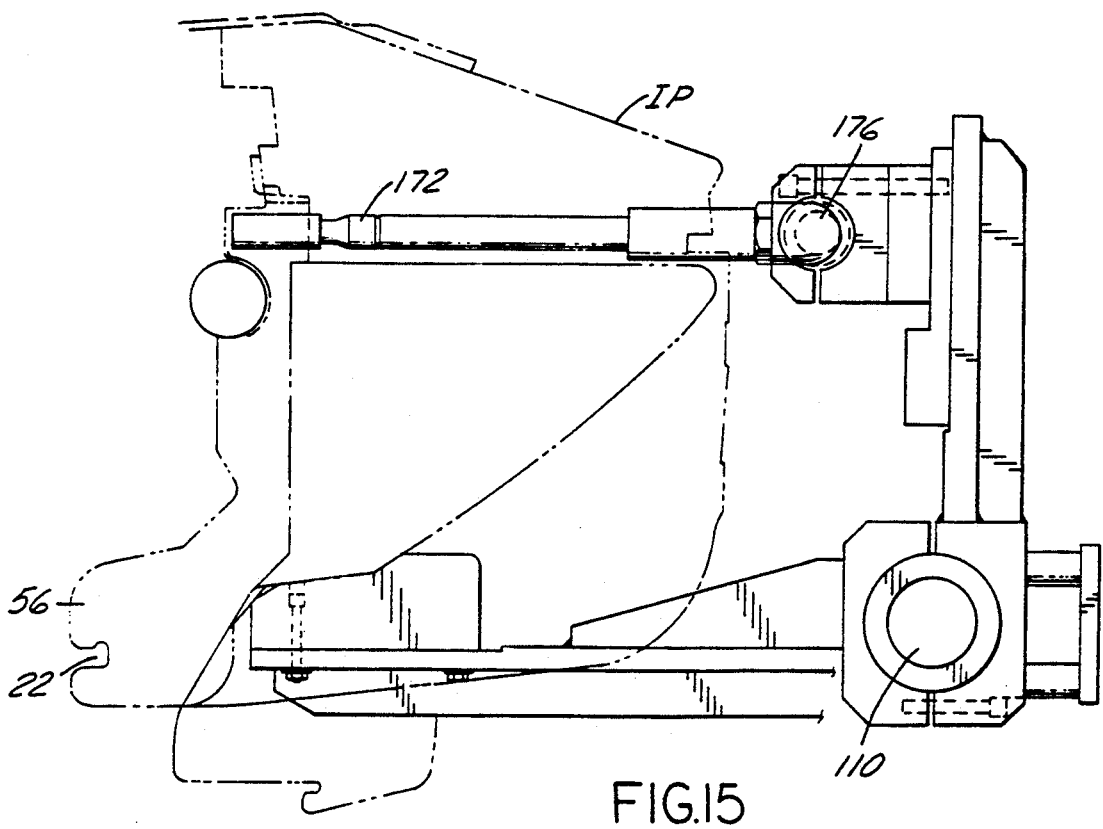
FIG. 15 is a sectional view taken on the line 15—15 in FIG. 12.
Figure 16:
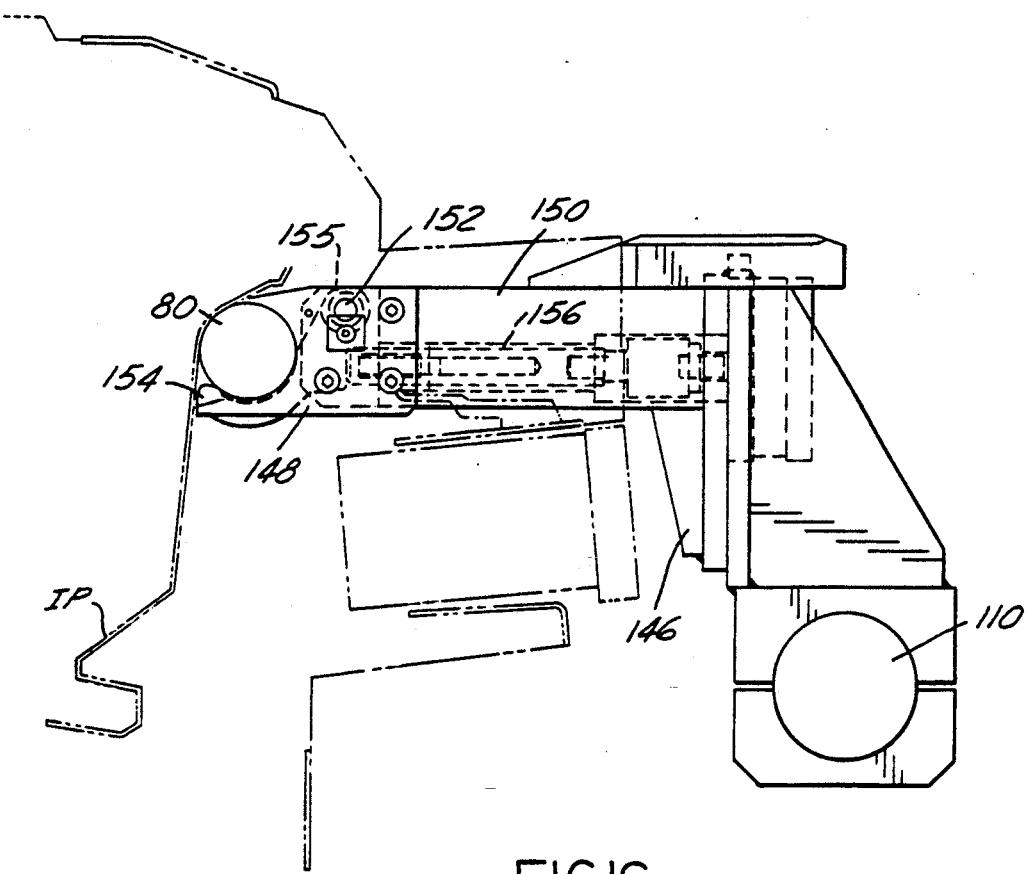
FIG. 16 is a sectional view taken on the line 16—16 in FIG. 12.
Figure 17:
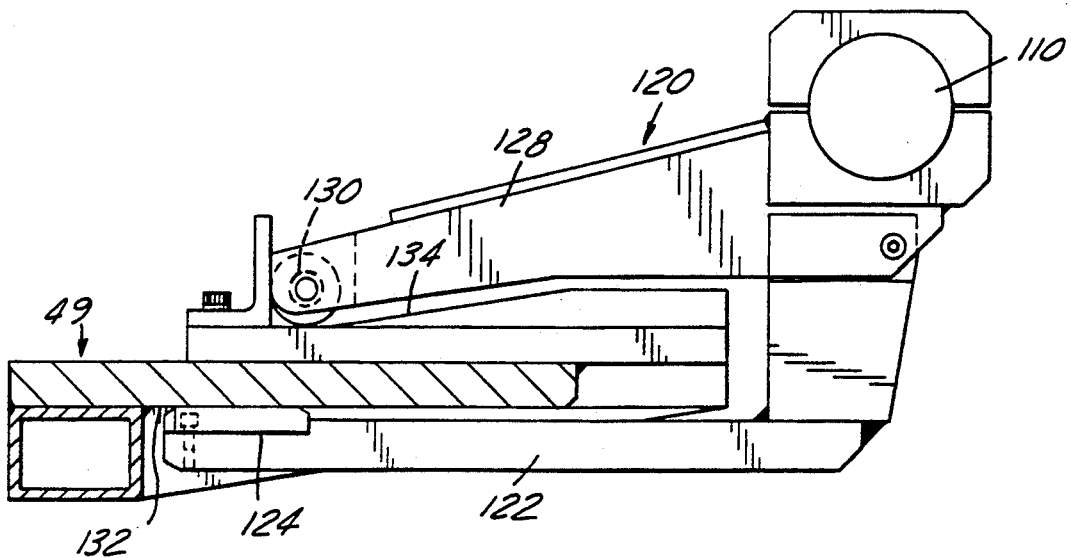
FIG. 17 is a sectional view taken on the line 17—17 in FIG. 12.
Figure 18:
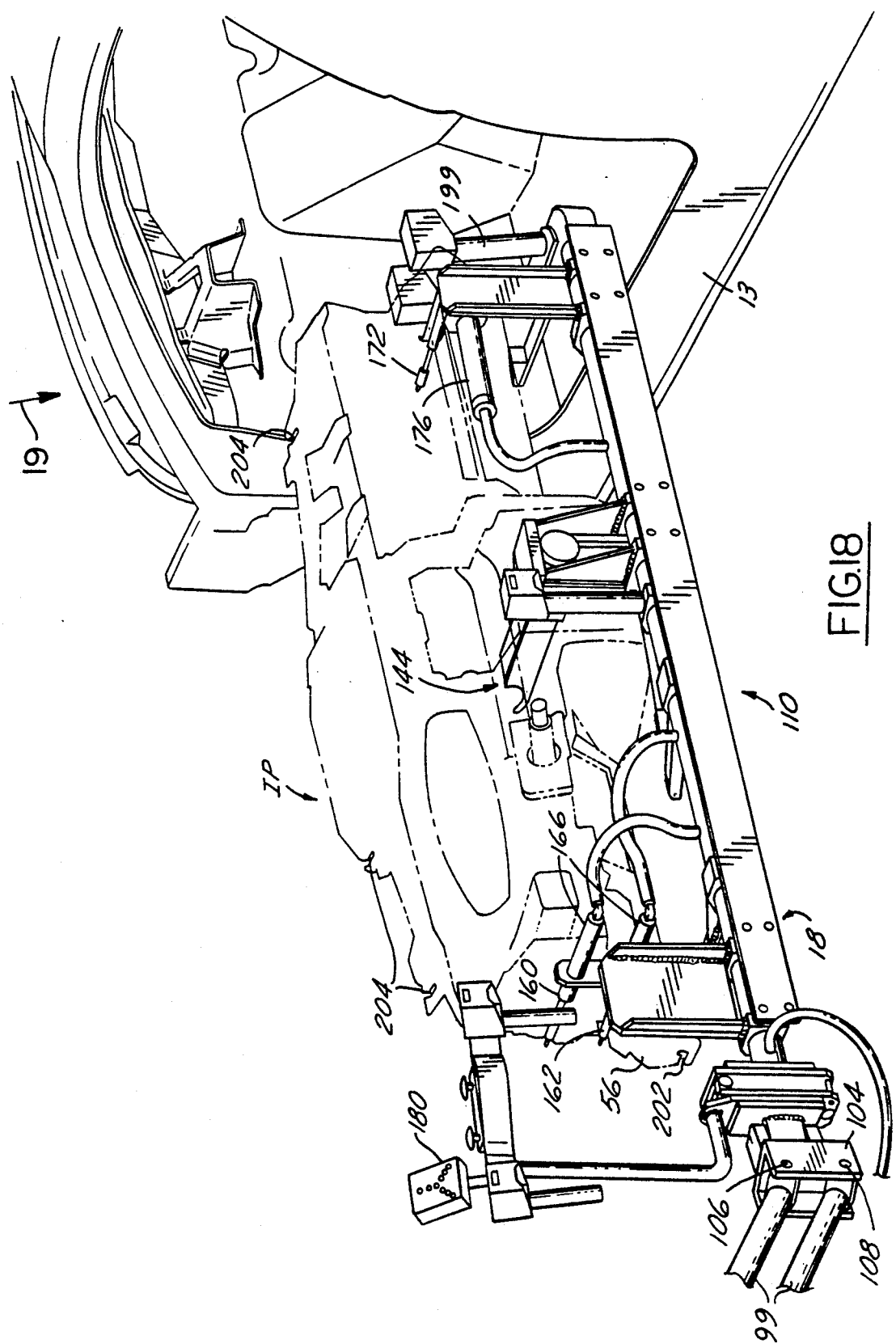
FIG. 18 is a perspective view of a portion of the swing frame assembly shown as it approaches the moving automotive vehicle body in preparation for the installation of the instrument panel assembly.
Figure 19:
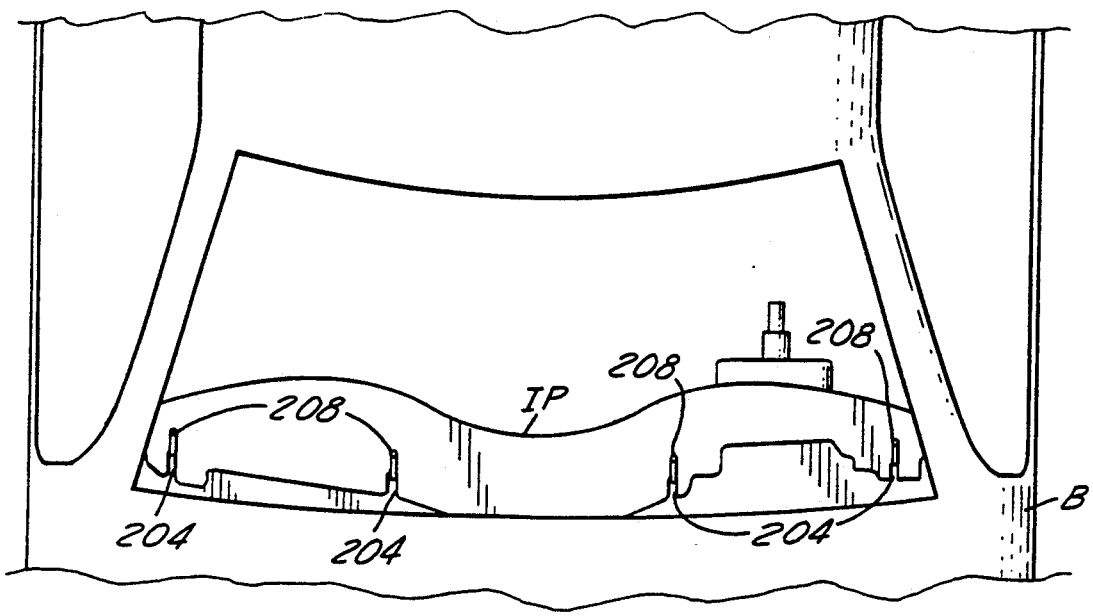
FIG. 19 is a fragmentary view looking in the direction of the arrow 19 in FIG. 18.
Figure 20:
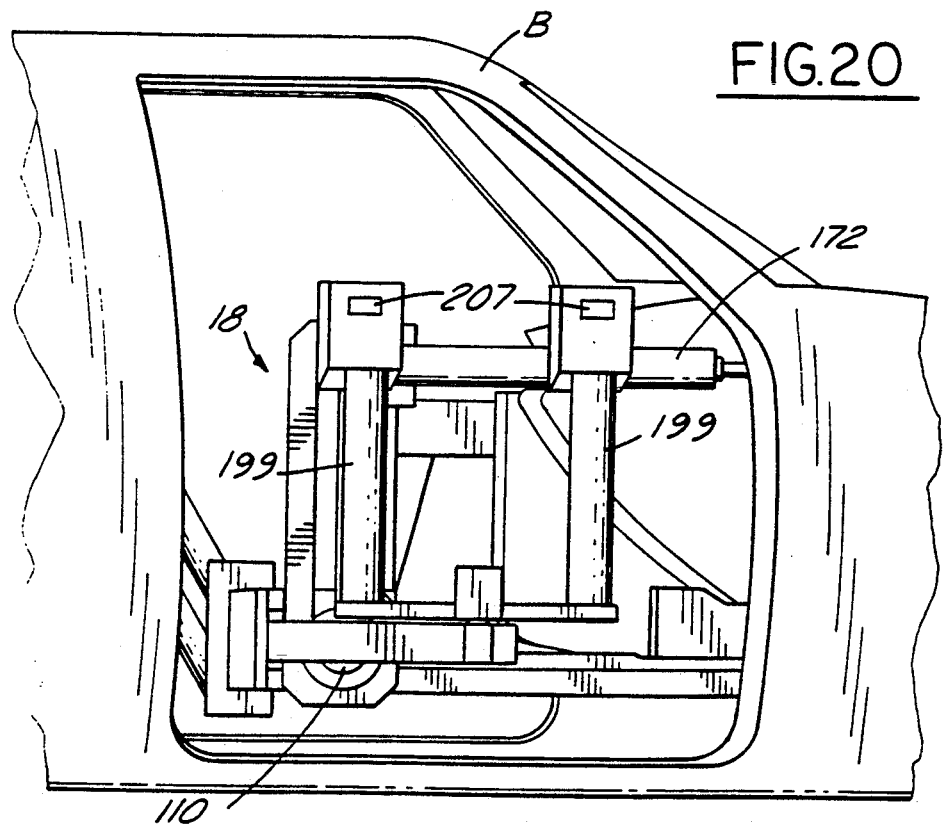
FIG. 20 is a view as seen from the opposite side of the vehicle body showing a portion of the swing frame assembly extended therein.
Figure 21:
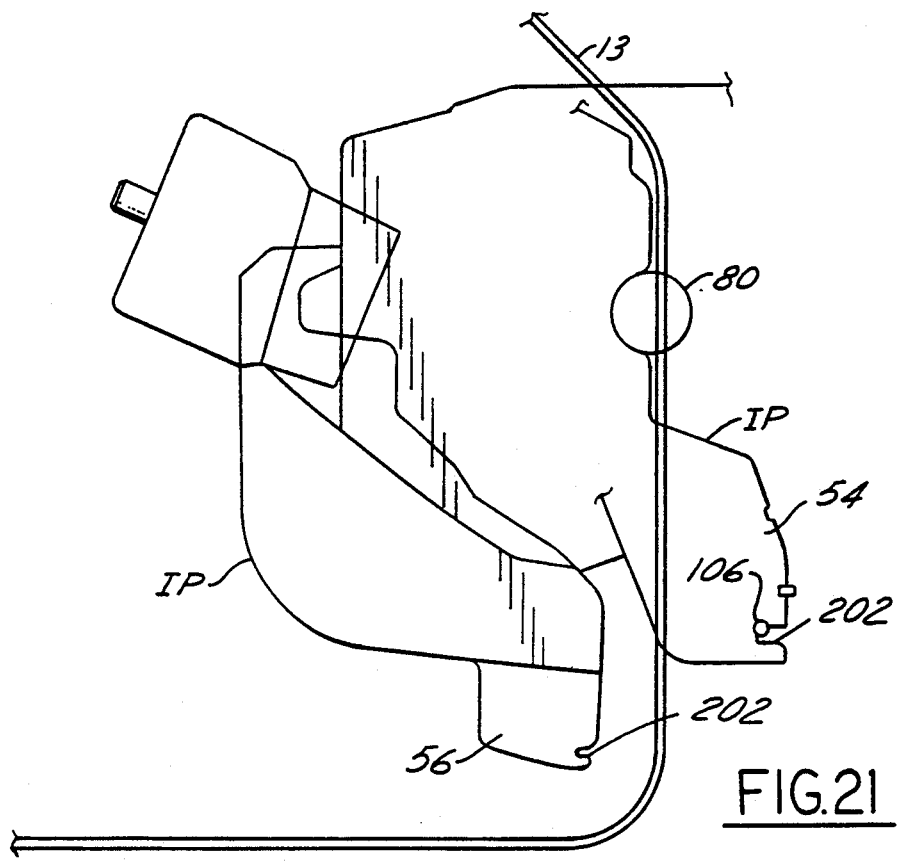
FIGS. 21 and 22 are perspective views showing the instrument panel assembly installed in the vehicle body as seen from opposite sides thereof.
Figure 22:
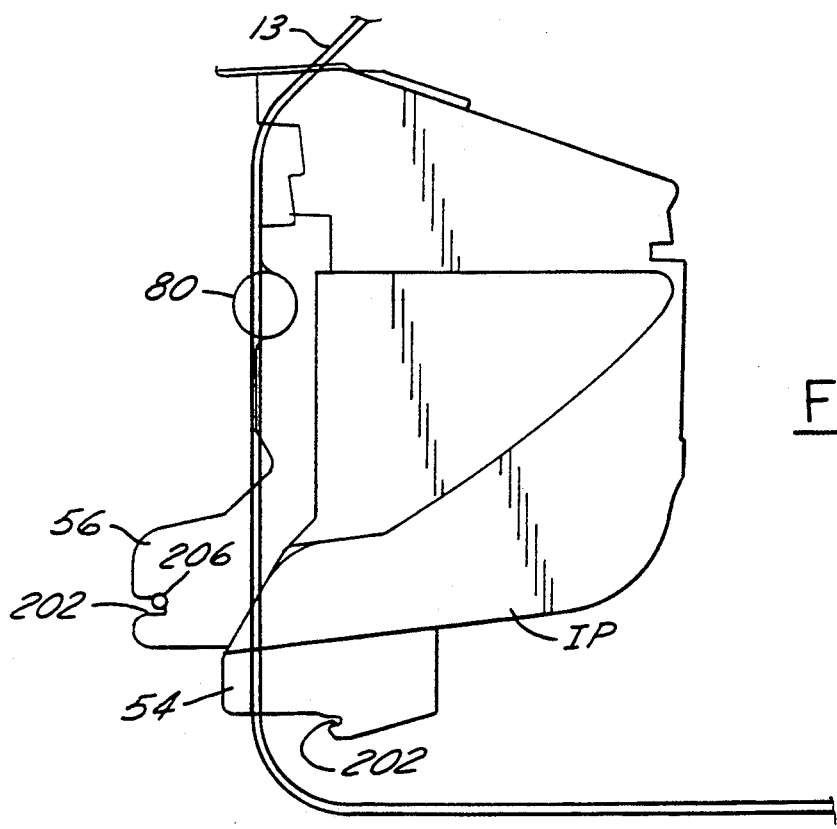
Figure 23:
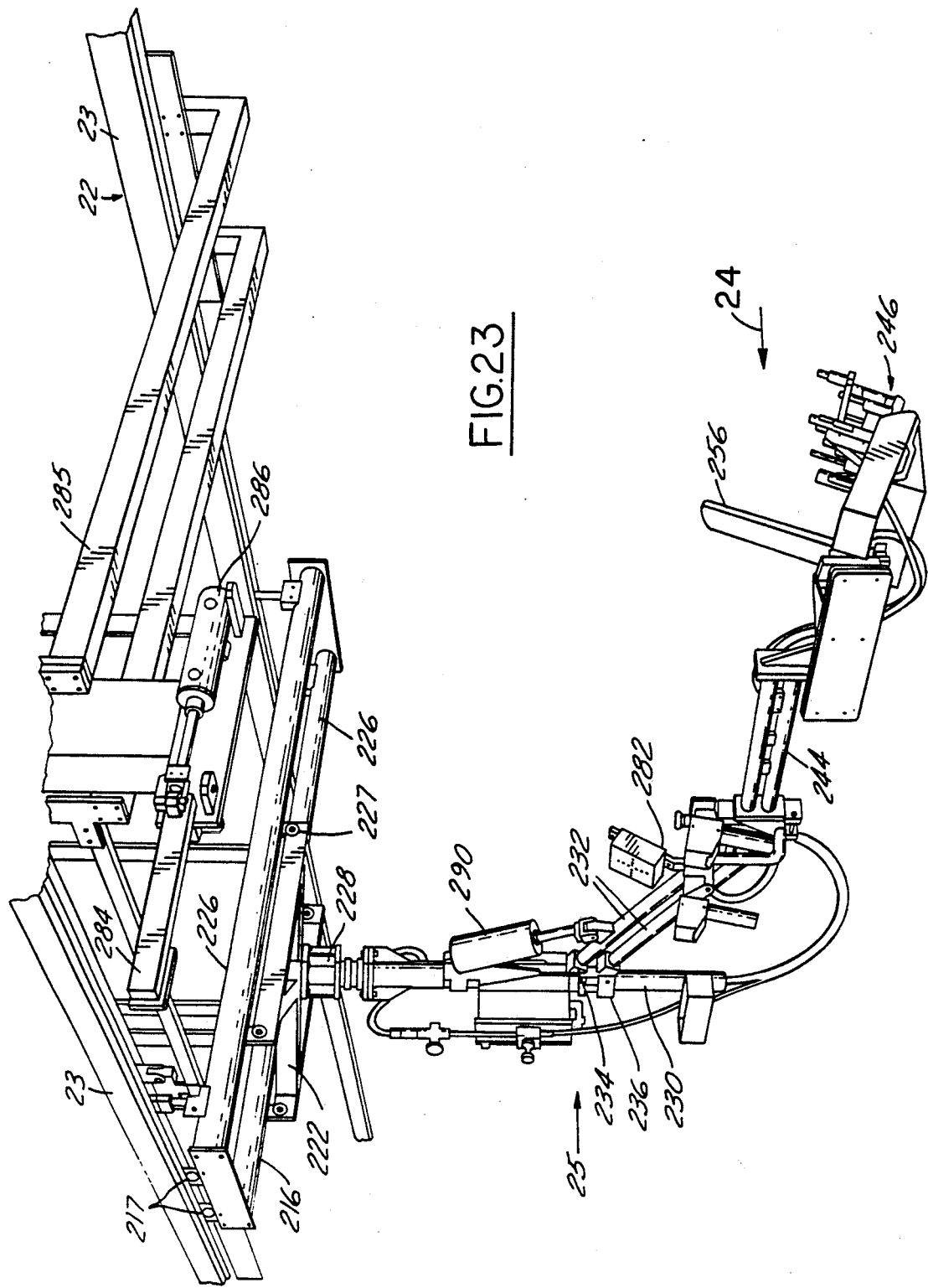
FIG. 23 is a perspective view showing the second swing frame assembly and the traveling bridge on which it is mounted.
Figure 24:
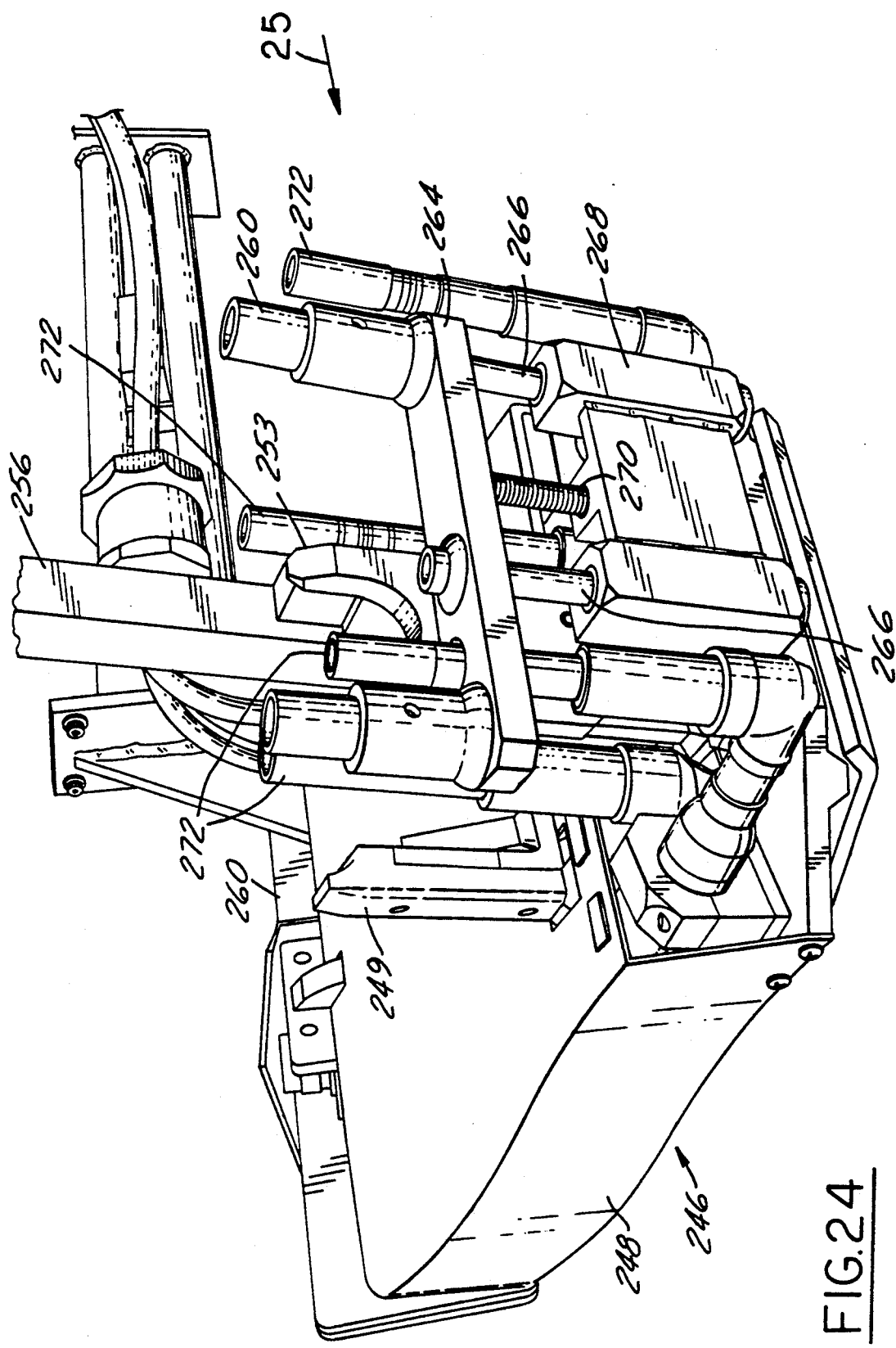
FIG. 24 is a perspective view looking in the direction of the arrow 24 in FIG. 23.
Figure 25:
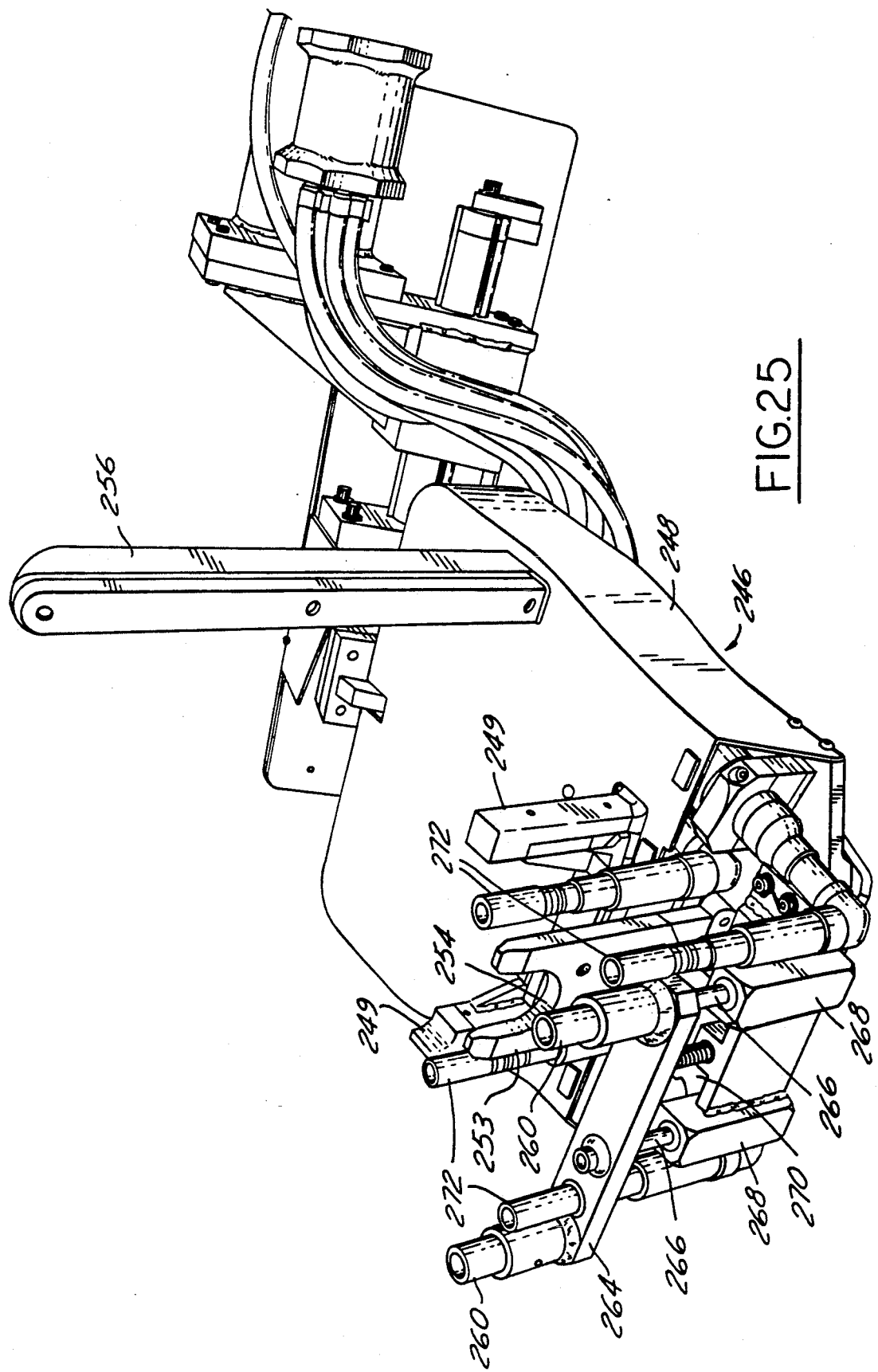
FIG. 25 is a perspective view looking in the direction of the arrow 25 in FIG. 24.
Figure 26:
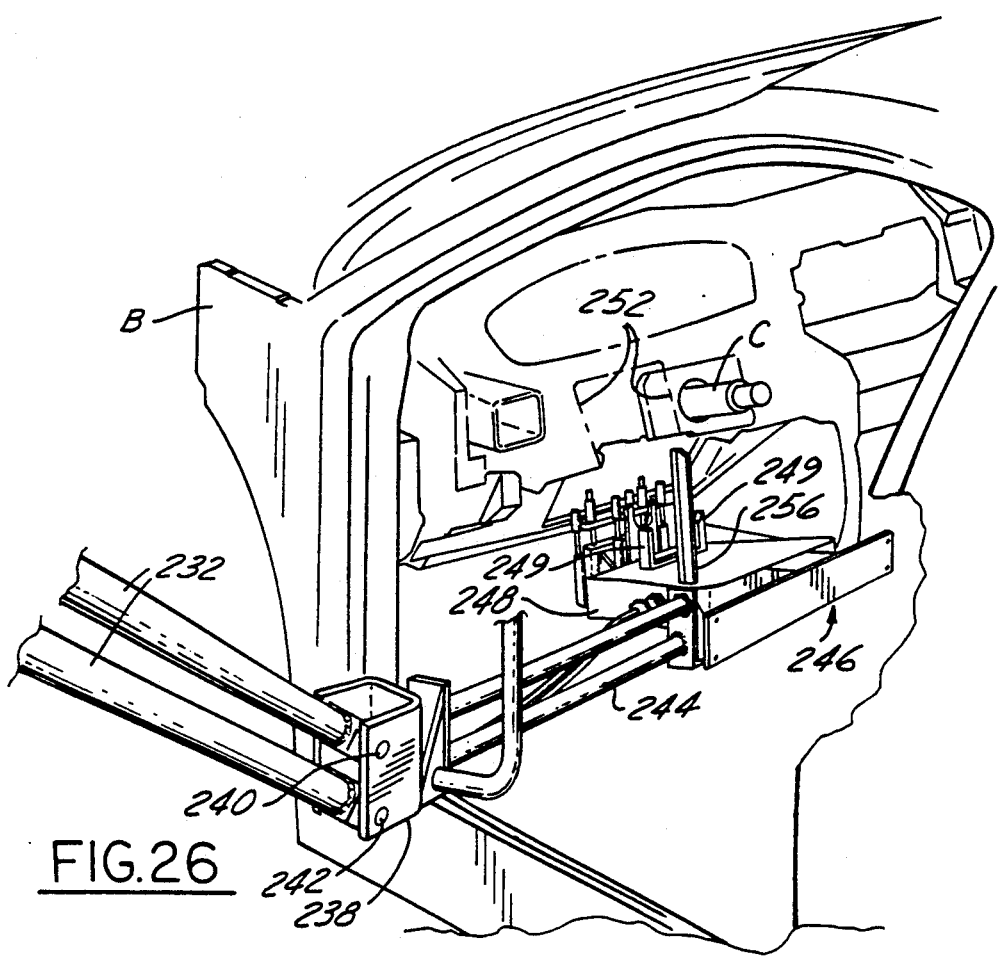
FIG. 26 is a perspective view showing a portion of the second swing frame assembly extended into the vehicle body.
Figure 27:
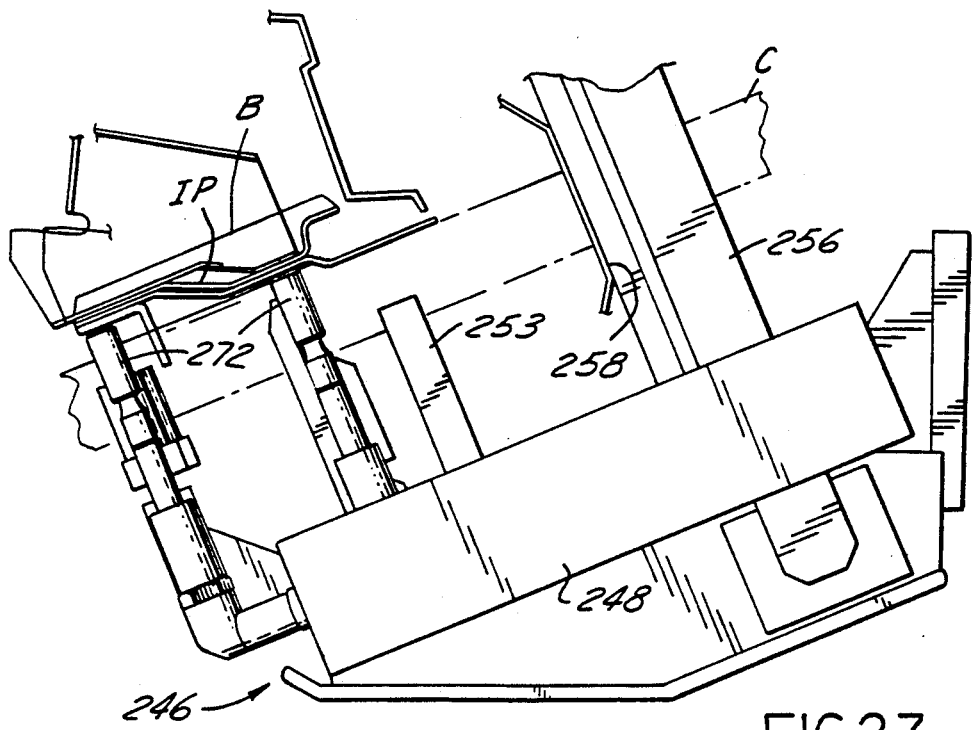
FIG. 27 is a view showing the final bolting of the instrument panel assembly to the frame of the vehicle body.

The swing frame assembly 18 can be swung from a position in which the beam 110 is parallel to the fixture 26 at the pick-up station (dotted lines in FIG. 1) to a position in which the beam is at right angles thereto (solid lines in FIG. 1). Stops 181 and 182 on brake disk 96 determine these two positions by engagement with the arm 183 on column 98. See FIG. 13A. When the arm 183 strikes stop 182 as the swing frame assembly reaches the position in which the beam is at right angles to the pick-up station, arm 183 also engages and actuates limit switch 184 which operates the brake pads 101 to engage brake disk 96 and prevent further rotation of the swing frame assembly. A detent 185 on carrier 88 is spring-urged to engage a stop 189 on the bridge 20 when the carrier moves to its position adjacent the pick-up station. Actuation of limit switch 184 also retracts detent 185 to permit the carrier to move away from its position adjacent the pick-up station.

As previously stated, when the swing frame assembly 18 is in the process of inserting an instrument panel assembly into a moving car body B on the assembly line 12, the bridge 20 on which the swing frame assembly is mounted moves in unison with the car body. For this purpose the bridge 20 is connected to a second bridge 186 by piston-cylinder assemblies 187. Bridge 186 extends parallel to bridge 20 and has roller units 189 engaging the rails 23 of track 22 for movement therealong. Bridge 186 has two arms which are normally swung apart to aligned positions paralleling the path of the assembly line 12 but which can be individually swung 90 degrees toward one another by piston cylinder assemblies 192 and 194 so that they are parallel and point toward the assembly line. In the latter positions, they cross the paths of the vertical posts 14 on the body carriers 10. The operator extends arm 190 by means of one of the controls on panel 180. Arm 188 is extended in response to a limit switch 196 on arm 190 being contacted by a post 14 on a car body carrier 10. Piston-cylinder assemblies 187 are operated by means of the control on panel 180 to move bridge 20 closer to or farther from bridge 186, as desired.

To take an instrument panel assembly from the pick-up station, the operator turns the swing frame assembly to a position in which the stop 181 is engaged and the beam 110 is generally parallel to the rail 24 along which trolley 28 moves. The operator moves the carriage 88 of the swing frame assembly along bridge 20 toward the pick-up station to a point where detent 185 engages stop 189 to prevent reverse movement of carriage 88, and manipulates the beam 110 so that the probe 120 engages the locating device 49 of fixture 26 on a trolley moving through the pick-up station. Simultaneously, the instrument panel assembly will become supported on rests 136 and 138 and engage anti-rotation member 137. Also fasteners 164 and 174 and locator pin 166 will be projected through holes in the instrument panel assembly. The tube 80 of the instrument panel assembly is now extended into the fixed C-shaped fingers 148 and 150 of clamping device 144. The pivotal finger 154 of the clamping device is operated by the cylinder 156 to grip the tube 80 so that the instrument panel is now firmly secured to the beam. Pin 76 is withdrawn to release the instrument panel assembly from the fixture 26, so that the operator may move the beam and instrument panel assembly away from the fixture.

The swing frame assembly with the instrument panel assembly is swung approximately 90 degrees so that beam 110 is perpendicular to the pick-up station and arm 183 strikes stop 182 to limit further swinging movement. Arm 183 simultaneously engages and actuates limit switch 184 to operate brake pads 101 which engage brake disk 96 and lock the swing frame assembly in this position. The limit switch also causes detent 185 to release and permit the swing frame assembly to be moved along bridge 20 toward the assembly line.

By means of a switch at the control 180, the operator actuates the cylinder 194 to extend arm 190 into the path of the posts 14 on car body carriers 10. The post of the next body carrier 10 will engage arm 190, and limit switch 196 on arm 190 when contacted by the post will actuate cylinder 192 to extend arm 188 and thus entrap the post between the arms. The bridge 20 will thereupon move with the body carrier and the swing frame assembly will of course move with the bridge.

The operator manually advances the swing frame assembly along bridge 20 toward the assembly line 12 and manipulates the beam, carrying the instrument panel assembly, into the open side of a car (the doors are not on the car body at this stage of production). A second operator on the opposite side of the car body may use handles 199 to assist in maneuvering the beam into position for installation of the instrument panel assembly.

Referring to FIGS. 19-22, the instrument panel assembly has lower side frame members 200 provided with notches 202, and also has laterally spaced notches 204 along the upper edge portion thereof. The notches 202 of a properly installed instrument panel assembly engage studs 206 projecting inwardly from the side panels of the car body and the notches 204 engage studs 208 projecting upwardly from the cowl of the car body.

Prior to properly installing the instrument panel assembly with the studs and notches engaged, the instrument panel assembly is spaced rearwardly slightly from its installed position, so that an additional component or components can be attached to the instrument panel assembly by the second operator. When this has been accomplished, the cylinder assemblies 187 are actuated by the first operator using controls on panel 180 to advance the bridge 20 forwardly relative to bridge 186 and cause the instrument panel assembly to assume a properly installed position in which the notches 202 and 204 engage studs 206 and 208. Prior to this advance of the instrument panel assembly, the second operator will press release buttons 207 next to handles 199 to permit the control on panel 180 to be operated by the first operator, insuring that the instrument panel assembly is not advanced without the concurrence of both operators and that the second operator has both hands on handles 199.

When in properly installed position, the instrument panel assembly is secured to the frame of the auto body by operation of tool motors 166 and 176 to drive fasteners 164 and 174 in to the frame Of the body.

After the instrument panel assembly has been installed and secured in the car body by the swing frame assembly 18, the clamping device 144 is released and the swing frame assembly is manually withdrawn from the car body. The operator using a control on control 180 causes the cylinder assembly 194 to retract the arm 190 thereby releasing the post 14 on the car body carrier 10 so that the bridge 20 and swing frame assembly 18 no longer move with the advancing car body. When arm 190 swings to its release position, the limit switch 196 on arm 190 is released causing the cylinder 192 likewise to retract the other arm 188.

Farther along the assembly line, there is a second bridge 216 having roller units 217 engaged with the rails 23 of track 22 for movement along the track. See FIGS. 23-27. The bridge 216 is generally parallel to the bridge 20 and thus extends generally perpendicular to the path of the assembly line 12.

The second swing frame assembly 25 has a carriage 222 provided with roller units 224 which engage the rails 226 of bridge 216 to enable the carriage to move along bridge 216 toward and away from the assembly line 12.

Affixed to the bottom of the carriage 222 is a head 228, and extending vertically downwardly from the head is a column 230 which is pivoted to the head for axial rotation. An articulated arm assembly projects radially outwardly from column 230 and has a pair of parallel arms 232 secured at one end to a bracket on the column for vertical swinging movement on pins 234 and 236. The opposite ends of the arms are connected to an upright bracket 238 for vertical pivotal movement on pins 240 and 242. The pins 234, 236, 240 and 242 are arranged in a rectangular pattern on parallel axes so that the arms 232 form a parallelogram linkage and pivot up and down as a unit while the upright bracket 238 at the end of the arms remains at all times in the same upright position.

Projecting generally horizontally from the upright bracket 238 is a beam 244 on the outer end of which is a final attaching or mounting unit or tool 246 having means for finally and rigidly securing the instrument panel assembly IP, and particularly the steering column C which forms a part of the instrument panel assembly, to the frame of the body B. The steering column is not shown in FIGS. 5A and 5B for clarity of illustration of the instrument panel, but is a part of the instrument panel assembly when it reaches the pick-up station.

The attaching or mounting unit 246 has a base 248 on which are mounted a pair of laterally spaced upwardly extending bars 249 which are adapted to extend into an opening in the instrument panel assembly and locate on the side surfaces 252 of the opening. Also projecting upwardly from the base is a plate 253 having a generally U-shaped recess 254 in the top surface which is adapted to engage and locate on the steering column C. Also, an upright bar 256 is adapted to locate in a recess 258 on the instrument panel. In addition to the locators 249, 253 and 256, a pair of socket locators 260 are adapted to engage studs projecting from the instrument panel assembly. These socket locators 260 are mounted on a plate 264 carried by spaced parallel rods 266 axially slidably supported in rod guides 268 on the base to enable the plate to move inwardly and outwardly relative to the base. The plate 264 is pressed outwardly to the limiting position shown by the spring 270.

Socket drivers 272 are carried by the base for driving fasteners through the steering column of the instrument panel assembly and into the body frame. The socket drivers are located inwardly of or below the outer ends of locators 260 in the outer limiting positions thereof. As these socket locators 260 engage the studs, spring 270 compresses to bring the fastener drivers 272 into contact with the steering column of the instrument panel assembly to drive fasteners through openings in the steering column and instrument panel and into the frame of the car body for final rigid attachment to the car body. The spring 270 permits locators 260 to continue to yield until the fasteners are fully seated. These fastener drivers 272 are operated by motors 280 under the control of the operator by controls at the control panel 282.

In order to cause the swing frame assembly 25 to move with the car body as the body continues to move along the assembly line, an arm 284 is pivoted to a bridge 285 which rolls on track rails 23 in advance of bridge 216 and is rigidly connected to bridge 216. The arm 284 is pivoted for horizontal swinging by a piston-cylinder assembly 286. Normally this arm is retracted to a position aligned with the path of the assembly line, but it can be swung 90 degrees toward the assembly line to a position in which it crosses the path of the vertical posts 14 on the body carriers 10. The operator extends this arm by means of a button on the control panel 282 to operate the piston-cylinder assembly 286.

The beam 244 can be raised and lowered manually. An air balancing piston-cylinder assembly 290 connected at one end to the column 230 and at the other end to one of the arms 232 will maintain the beam at whatever elevation the operator selects without changing its horizontal circulation.

In use, the operator depresses the button on the control panel 282 to operate cylinder assembly 286 and extend arm 284 which is contacted by the post 14 on a moving car body carrier 10. The bridge 216 and swing frame assembly 25 now move in unison with the car body. The operator manually turns the swing frame assembly toward the car body and advances it along bridge 216 until the mounting unit or tool 246 on the end of beam 244 enters the car body. Then the mounting unit is properly located with respect to the installed instrument panel assembly by means of the locators 249, 253 and 256 and socket locators 260 and the fastener drivers 272 drive fasteners through the steering column and into the car body as previously described. The control panel 282 includes a control for the air cylinder 292 so that the operator may use this cylinder to hold the beam up while the fasteners are being driven in. Upon completion of this final securement of the instrument panel assembly to the car body, the operator withdraws the swing frame assembly from the car body, and retracts arm 284 by operation of cylinder 286 to release the post 14 of the body carrier 10 so that bridge 216 and the swing frame assembly 25 no longer move with the car body.

What is claimed is:

1. Apparatus for transferring an instrument panel assembly from a pick-up station to the interior of an automotive vehicle body for installation while said body moves along a path spaced laterally from said pick-up station, comprising track means extending generally parallel to said path, a first bridge mounted for movement along said track means, said first bridge extending between said pick-up station and said path, a swing frame assembly comprising a carriage mounted on said first bridge for movement between first and second positions adjacent said pick-up station and said path, respectively, an arm pivoted to said carriage for swinging movement about a generally vertical axis, means for holding an instrument panel assembly on said arm, said arm being swingable from a receiving position for picking up an instrument panel assembly at said pick-up station when said carriage is in its first position to a transfer position in which said instrument panel assembly may be introduced into said body and installed therein when said carriage is moved along said track means with the body, means for moving said first bridge with said body, a second bridge mounted for movement generally parallel to said path, said second bridge extending transversely of said path and being spaced from said first bridge in the direction of vehicle body movement, a second swing frame assembly comprising a second carriage mounted on said second bridge for movement therealong, a second arm pivoted to said second carriage, a mounting unit on said second arm having means for attaching the installed instrument panel assembly to the frame of the vehicle body, said second swing frame assembly being movable along said second bridge to introduce said second arm into the moving body, means for operating said attaching means after introduction of said second arm into the moving body to secure the installed instrument panel assembly to the frame of the body, and means for moving said second bridge with said body.

2. Apparatus as defined in claim 1, and further including means for guiding said second arm into a predetermined position with respect to the installed instrument panel assembly prior to said operation of said attaching means.

3. Apparatus as defined in claim 1, wherein said means for moving said second bridge with said body comprises an abutment on said body, an extendable arm, means mounting said extendable arm for movement with said second bridge, said extendable arm being shiftable from a retracted position to an extended position in the path of said abutment to be engaged thereby and means for shifting said extendable arm between retracted and extended positions.

4. Apparatus as defined in claim 1, wherein said second arm is generally horizontal and is pivoted to said second carriage for swinging movement about a generally vertical axis, and further including means for raising and lowering said second arm while maintaining said second arm generally horizontal.

5. Apparatus as defined in claim 4, and further including means for guiding said second arm into a predetermined position with respect to the installed instrument panel assembly prior to said operation of said attaching means.

* * * * *